(12) United States Patent
Kapitulskiy et al.

(10) Patent No.: US 6,741,942 B2
(45) Date of Patent: May 25, 2004

(54) FREE-FLOW FLUID MEASUREMENT METER

(75) Inventors: Alexander Kapitulskiy, Afula (IL); Niv Pinsky, Kibbutz Afikim (IL); Rony Andrei, Tiberias (IL); Zvi Herman, Haifa (IL)

(73) Assignee: S.A.E. Afikim, Kibbutz Afikim (IL)

( * ) Notice: Subject to any disclaimer, the term of this patent is extended or adjusted under 35 U.S.C. 154(b) by 35 days.

(21) Appl. No.: 10/041,135

(22) Filed: Jan. 7, 2002

(65) Prior Publication Data

US 2003/0130808 A1 Jul. 10, 2003

(51) Int. Cl.[7] .................................................. G01F 1/00
(52) U.S. Cl. ......................................................... 702/45
(58) Field of Search .............................. 702/45; 73/219, 73/1.35, 224, 223, 816, 302, 200, 215, 202, 229; 137/861, 395, 409; 250/432

(56) References Cited

U.S. PATENT DOCUMENTS

| | | | |
|---|---|---|---|
| 3,349,617 A | | 10/1967 | Hartstone |
| 3,392,580 A | | 7/1968 | Bain |
| 3,527,251 A | | 9/1970 | Hagstrom |
| 3,871,230 A | | 3/1975 | Dye |
| 3,929,412 A | | 12/1975 | Villari |
| 4,253,332 A | * | 3/1981 | Sabatino et al. ............... 73/224 |
| 4,346,596 A | | 8/1982 | Diamant |
| 4,452,176 A | | 6/1984 | Hoefelmayr |
| 4,476,719 A | | 10/1984 | Millar |
| 4,669,307 A | * | 6/1987 | Wakui et al. ................... 73/223 |
| 5,083,459 A | | 1/1992 | Lind |
| 5,117,115 A | * | 5/1992 | Gartner ................... 250/432 R |
| 5,635,637 A | | 6/1997 | Boult |
| 6,308,553 B1 | * | 10/2001 | Bonne et al. ................. 73/1.35 |
| 6,324,906 B1 | * | 12/2001 | Rinkewich et al. ............ 73/219 |
| 6,497,143 B1 | * | 12/2002 | Rinkewich .................... 73/224 |

FOREIGN PATENT DOCUMENTS

| | | | | |
|---|---|---|---|---|
| DE | 32 35 405 | * | 3/1984 | ........... G01F/11/28 |
| DE | 197 21 965 | * | 4/1997 | ......... G01N/27/416 |
| EP | 0 106 971 | * | 5/1984 | ........... G01F/11/28 |
| GB | 1 280 160 | | 7/1972 | |

* cited by examiner

*Primary Examiner*—John Barlow
*Assistant Examiner*—Tung Lau
(74) *Attorney, Agent, or Firm*—Lilling & Lilling P.C.

(57) ABSTRACT

Apparatus for measuring a liquid's flow rate which includes a housing, a set of electrical sensors and a processing apparatus. The housing includes a separation wall which divides the housing into measurement and discharge chambers and contains a slot which allows the liquid to freely flow from the measurement chamber into the discharge chamber. The sensor apparatus includes a reference sensor and a common sensor positioned proximate to the floor, and a set of measurement sensors positioned within the measurement chamber. The measurement sensors are spaced apart in a generally vertical stepped continuum stretching from the floor to a height substantially equal to the top of the separation wall. A processing apparatus processes the data according to a preprogrammed process. Processing includes measuring an electrical parameter of the liquid proximate to the floor of the apparatus and at various levels of the liquid and normalizing the results. The normalized values can be correlated to the flow rate of the liquid.

39 Claims, 5 Drawing Sheets

FREE-FLOW FLUID MEASUREMENT METER

FIELD OF THE INVENTION

The present invention relates to a free-flow fluid measurement meter for metering the flow of liquids, particularly milk, and a method for employing such an apparatus.

BACKGROUND OF THE INVENTION

Free-flow milk meters are known. They provide a valuable tool in monitoring milk production on an individual animal basis. One of their benefits is that milk volume or mass can be measured without batching the milk. Thus, a reading of the milk produced by a cow can be obtained while the milk is being delivered to storage vats directly from the cow.

The measurement of milk produced by animals is a difficult task because the milk being measured is actually a two-phase, gas-liquid system. In modern milking installations, the milk coming from the cow is pumped in a pulsed fashion, permitting the entry of often large amounts of air. Physical properties used to measure milk flow rate, volume, or mass are generally dependent on the percentages of milk and air present. Milk that contains substantial amounts of air, often leads to spurious readings of the parameters used to track the volume, mass, or flow rate of the milk.

In the case of milk flow meters, the formation of froth or foam on top of the air-laden milk can never by avoided completely. In order to minimize the formation of froth or foam and diminish turbulence, the cyclical flow fluctuation caused by the pulsations of the required vacuum apparatus are typically smoothed as much as possible before the milk flows through the measuring chamber of the meter. Both the milk froth or foam and the turbulence cause measuring difficulties by impairing the signal of the sensor used in the milk meter. In addition, most milk meters are subject to milk spray when the milk enters the meter. As a result, during and after use, at least some, if not all, of the meter will be covered by a residue of sprayed milk. An unacceptable film of this milk residue, formed after each milking, must be removed by an adequate cleaning operation. Cleaning is generally effected after milking all members of a herd with the purpose of preventing the growth of microbial organisms.

Typical, free-flow milk meters which can be used to measure the flow rate of milk being delivered and/or the volume and/or mass being measured, without the use of batch measurements are described in U.S, Pat. Nos. 4,452, 176, 4,476,719, and 4,346,596, to Hoeflmayer et al., Millar et al. and Diament et al., respectively. All of these meters have complex structures with recessed, partially hidden, surfaces, which make cleaning these meters relatively difficult. Moreover, since they all use direct measurement of a parameter indicative of milk level in the meter, they are dependent on the amount of air present in the milk.

The problems related to milk meters are also encountered in other industrial and laboratory settings. Whenever there is a two-phase, gas-liquid system, measurement of the flow rate, volume, or mass of the liquid in the system is difficult. All these applications require meters that are relatively insensitive to the amount of gas present and which permit easy cleaning.

In what is discussed herein, "flow rate" is liquid rate of flow in mass per unit time e.g. kg/min while "total mass" relates to the integration of flow rate over the measurement duration.

SUMMARY OF THE PRESENT INVENTION

The present invention relates to a liquid measuring device, which has been developed, particularly, though not solely, for use as a milk meter which measures the flow and quantity of milk obtained from individual cows in a herd.

It is an object of the present invention to provide a free-flow liquid meter, particularly one for use with milk, that has a simple construction, is cheap to manufacture, and is easy to maintain.

It is a further object of the invention to reduce the air in the liquid being measured, thereby increasing the accuracy of the measurements.

It is an object of the present invention to provide a free-flow liquid metering apparatus that is easy to clean.

It is yet another object of the present invention to provide a method for reducing the effect of entrained gases or air when measuring the flow rate of a free flowing liquid.

The present invention provides a free-flow liquid metering apparatus that consists of a block of sensors, typically electrodes, usually conductivity electrodes, in a specific configuration for precision measurement of the level of liquid in the meter. The measurement sensors are positioned in a helical configuration, a staircase configuration or an otherwise generally stepped configuration. The sensors are positioned between a separation wall containing a slot through which the liquid freely exits and a baffle. The baffle prevents liquid entering the measurement chamber from splashing the electrodes, while freeing entrained gases.

According to one aspect of the present invention, the invention provides a method of measuring flow or volume or mass of a liquid. The method includes the steps of causing the liquid being measured to flow through a slot of generally narrow width but long verticality so that a pool of liquid is maintained upstream of the slot such that the level of the liquid in the pool is a function of the flow rate of the liquid. The flow rate is indicated by measuring the level of liquid in the pool. In addition, the method requires the normalization of the parameter being measured, the parameter typically being conductivity.

According to another aspect of the invention, a baffle is taught where the baffle extends from an upper portion of the free-flow liquid meter's housing to a lower portion of the meter. The baffle thereby provides a continuous flow surface from the upper portion of the meter's housing into the lower portion of the housing, preventing splashing on the electrode by the entering liquid.

There is thus provided in accordance with the present invention an apparatus for measuring the flow rate of a liquid tending to froth. The apparatus includes a flow-through housing having an interior and a floor. The housing further includes a separation wall which divides the housing into a measurement chamber and a discharge chamber. The separation wall has a slot in it which allows the liquid to freely flow from the measurement chamber into the discharge chamber. The housing has an inlet communicating with the measurement chamber through which liquid enters the housing. The housing also has an outlet communicating with the discharge chamber through which liquid exits the housing. The apparatus also includes electrical sensor apparatus for sensing the level of the liquid in the measurement chamber. The electrical sensor apparatus includes a reference sensor and a common sensor both positioned proximate to the floor, and a plurality of measurement sensors, These sensors are positioned within the measurement chamber. The measurement sensors are spaced apart in a generally vertical stepped continuum stretching from the floor of the housing to a height substantially equal to the top of the separation wall at predetermined measurement intervals. The apparatus also includes a processing apparatus for evaluating a flow rate, according to a preprogrammed process, based on readings received from the sensors.

Further, in accordance with another embodiment of the measuring apparatus, the processing apparatus includes a microprocessor which receives readings from sensors, and converts the readings to a flow rate by using a look-up table stored in a memory or storage unit. The look-up table correlates the readings to a flow rate. In other embodiments of the measuring apparatus, the processing apparatus includes a microprocessor which receives readings from sensors, and converts the readings to a flow rate by using a function which is stored in a memory or storage unit. The function correlates the readings to a flow rate.

Additionally, in accordance with a preferred embodiment of the measuring apparatus, during use of the processing apparatus, the common and reference sensors measure an electrical parameter of the liquid proximate to the floor of the housing determining a first value, and one or more of the plurality of measurement sensors measures an electrical parameter of the liquid in the one or more measurement sensor's designated range so as to determine one or more second values. The processing apparatus further includes means for normalizing the electrical parameter measurements of the liquid by evaluating the one or more second values in relation to the first value, obtaining one or more normalized values of the parameter. In addition the processing unit includes a means for converting the one or more normalized values to a flow rate. In some embodiments of the measuring apparatus, the means for normalizing the parameter measurements and the means for converting the one or more normalized values is a microprocessor.

In another preferred embodiment of the measuring apparatus, the plurality of measurement sensors are positioned in a generally stepped configuration, one or more measurement sensors per step. The bottom of the bottommost measurement sensor is positioned in, and extends from, the floor of the housing. The top of the topmost sensor is positioned substantially co-linear with the uppermost portion of the separation wall. In some embodiments of the measuring apparatus, the plurality of measurement sensors are positioned in a generally helically stepped configuration while in others the plurality of measurement sensors are positioned in a generally linear staircase configuration.

Additionally, in accordance with a preferred embodiment of the measuring apparatus, the sensors are electrodes. In accordance with yet another preferred embodiment of the measuring apparatus, the electrodes are electrodes which measure conductivity.

In another preferred embodiment of the measuring apparatus, the processing apparatus further includes an integrator operative to integrate over time a series of flow rates obtained in accordance with the preprogrammed process, thereby determining the mass of liquid delivered over that period of time. The time over which integration is effected is the duration of the measurements. In other embodiments, the integration is such that the volume of liquid delivered over that period of time is determined.

Additionally, in accordance with a preferred embodiment of the measuring apparatus, the processing apparatus, further includes a microprocessor which receives signals from the sensors, and converts the received signals to a normalized value of a parameter being measured. It then converts the normalized value to a flow rate by using a lookup table stored in a memory or storage unit of the processing apparatus. The look up table relates the normalized value of the measured parameter to a flow rate. In other embodiments of the measuring apparatus, a function is used instead. The function is stored in a memory or storage unit of the processing apparatus. The function relates the normalized value of the measured parameter to a flow rate.

In a preferred embodiment of the measuring apparatus, the apparatus further includes a baffle extending from an upper location of the housing to a lower location of the housing. The baffle has a lower free edge and provides a continuous flow surface from the upper location of the housing into the lower housing portion. The baffle is positioned upstream of the electrical sensor apparatus. It divides the measurement chamber into an inlet volume which receives a generally froth-laden liquid flow from the baffle, and a measurement volume which receives a generally reduced froth content liquid flowing between the lower free edge of the baffle and the floor.

Additionally, in accordance with a preferred embodiment of the measuring apparatus, the processing apparatus evaluates a volumetric flow rate while in other embodiments it evaluates a mass flow rate.

In another aspect of the present invention there is provided an apparatus for measuring the flow of a liquid tending to froth, which includes a flow-through housing which has an inlet formed at an upper location of the housing. The inlet facilitates the inflow into the housing of a liquid having a tendency to froth. The housing also includes a lower housing portion having an interior, a floor, and an outlet formed at a lower location for facilitating free outflow of the liquid from the lower housing portion. The housing also includes a cover configured for placement over the lower portion. A separation wall is positioned in the lower housing portion which divides the lower housing portion into a measurement chamber and a discharge chamber. The wall has a slot permitting free-flow of the liquid from the measurement chamber into the discharge chamber. The housing further includes an electrical sensor apparatus positioned in the measurement chamber for sensing the level of the liquid in the lower housing portion. Finally, the housing includes a baffle extending from an upper location to a lower location of the housing. The baffle has a lower free edge providing a continuous flow surface from the upper location of the housing into the lower housing portion. The baffle is positioned upstream of the electrical sensor apparatus, and divides the measurement chamber into an inlet volume and a measurement volume. The inlet volume receives a generally froth-laden liquid flow from the baffle, and the measurement volume receives a generally reduced froth content liquid flowing between the lower free edge of the baffle and the floor.

Additionally, in accordance with a preferred embodiment of the measuring apparatus, the baffle is formed unitarily with the cover. Removal of the cover removes the division of the lower housing portion into the separate inlet and measurement volumes.

Additionally, in a preferred embodiment of the measuring apparatus, the inlet is formed in the cover for facilitating the inflow into the housing of a liquid having a tendency to froth.

In accordance with another preferred embodiment of the measuring apparatus, the electrical sensor apparatus includes a reference sensor, a common sensor and a plurality of measurement sensors all positioned between the baffle and the separation wall in the measurement chamber. The reference and common sensors are positioned proximate to the floor and the plurality of measurements sensors are positioned vertically and configured to form a generally stepped continuum stretching from the floor of the housing to a height substantially equal to the uppermost portion of the separation wall. The plurality of measurement sensors is in contact with the liquid and measure a parameter with respect to the common sensor. The measured value is normalized using the value of the parameter as measured by the common sensor with reference to the reference sensor. The normalized parameter is convertible to a flow rate by using a processing apparatus according to a preprogrammed process.

Further, in a preferred embodiment of the measuring apparatus, the processing apparatus evaluates a volumetric flow rate, while in other embodiments, the processing apparatus evaluates a mass flow rate.

Additionally, in a preferred embodiment of the measuring apparatus, the electrical sensor apparatus includes a plurality of measurement sensors which are positioned in a generally stepped configuration, with one or more measurement sensor per step. The bottom of the bottom-most measurement sensor is positioned in, and extends from the floor of the housing, and the top of the topmost sensor is positioned substantially co-linear with the uppermost portion of the separation wall. In some embodiments of the measuring apparatus, the plurality of measurement sensors are positioned in a generally helically stepped configuration, while in other embodiments, the plurality of measurement sensors are positioned in a generally linear staircase configuration.

Further, in a preferred embodiment of the measuring apparatus, the electrical sensor apparatus includes a plurality of electrodes. In yet other embodiments, the plurality of electrodes are electrodes which measure conductivity.

In yet another aspect of the present invention there is a method provided for measuring the rate of flow of a liquid including the steps of:
 a. passing a liquid through a housing;
 b. measuring an electrical parameter of the liquid proximate to the floor of the housing so as to determine a first value;
 c. measuring the electrical parameter of the liquid at one or more levels in the housing, the one or more levels including the highest level reached by the liquid so as to determine one or more second value;
 d. normalizing the electrical parameter measurement of the liquid measured by evaluating the one or more second value in relation to the first value, thereby to obtain one or more normalized values; and
 e. converting the one or more normalized values to a flow rate in accordance with a preprogrammed process.

In yet another preferred embodiment of the method, the method further includes the step of integrating over time the flow rate determined at each measurement time in the converting step, and converting the integrated value to a volume of liquid passing through the housing over the time of the measurements. In another preferred embodiment, the method further includes the step of integrating over time the flow rate determined at each measurement time in the converting step, and converting the integrated value to a mass of liquid passing through the housing over the time of the measurements. The time over which integration is effected is the duration of the measurements.

Additionally, in accordance with a preferred embodiment of the method, the parameter of the liquid being measured is conductivity. In accordance with another preferred embodiment of the method, the liquid being measured is milk.

In yet other embodiments, the method described herein above can be applied to parameters other than electrical parameters.

BRIEF DESCRIPTION OF THE DRAWINGS

The present invention will be understood and appreciated more fully from the following detailed description taken in conjunction with the drawings in which.

Similar elements in the Figures are numbered with similar reference numerals.

DETAILED DESCRIPTION OF PREFERRED EMBODIMENTS

Free-flow liquid metering devices are known. Generally, these meters use a plurality of sensors positioned within a frothy, air-laden, liquid. The air entrained in the liquid makes measurements using such meters unreliable. Moreover, for many uses such as milk metering, the meters must be cleaned regularly. Cleaning these meters is often difficult because of their complex convoluted structures. Applicant has developed a simple to construct free-flow meter that permits ease of maintenance and cleaning. In addition, the positioning of the sensors and the baffle allows for accurate measurement of the parameter being monitored and minimizes the effects of entrained air. The method of monitoring, measuring and calculating flow, mass, or volume uses normalization techniques, which further increase the accuracy of the measurements.

While the invention herein will be discussed in terms of measuring milk flow, it should be readily understood that the flow of any liquid, including liquids with entrained gases, can be measured using the meter and method described herein below. Similarly, while the discussion of the invention is made in terms of measuring conductivity and using conductivity electrodes as sensors, it should be readily apparent that measuring and normalizing other parameters using other suitable sensors can also be used.

For ease in understanding the description below, the following should be noted. In the milk meter described herein, a slotted separation wall divides the lower portion of the meter's housing into a measurement chamber and a discharge chamber. The measurement chamber is further divided by a baffle into an input volume and a measurement volume.

Figure 1:
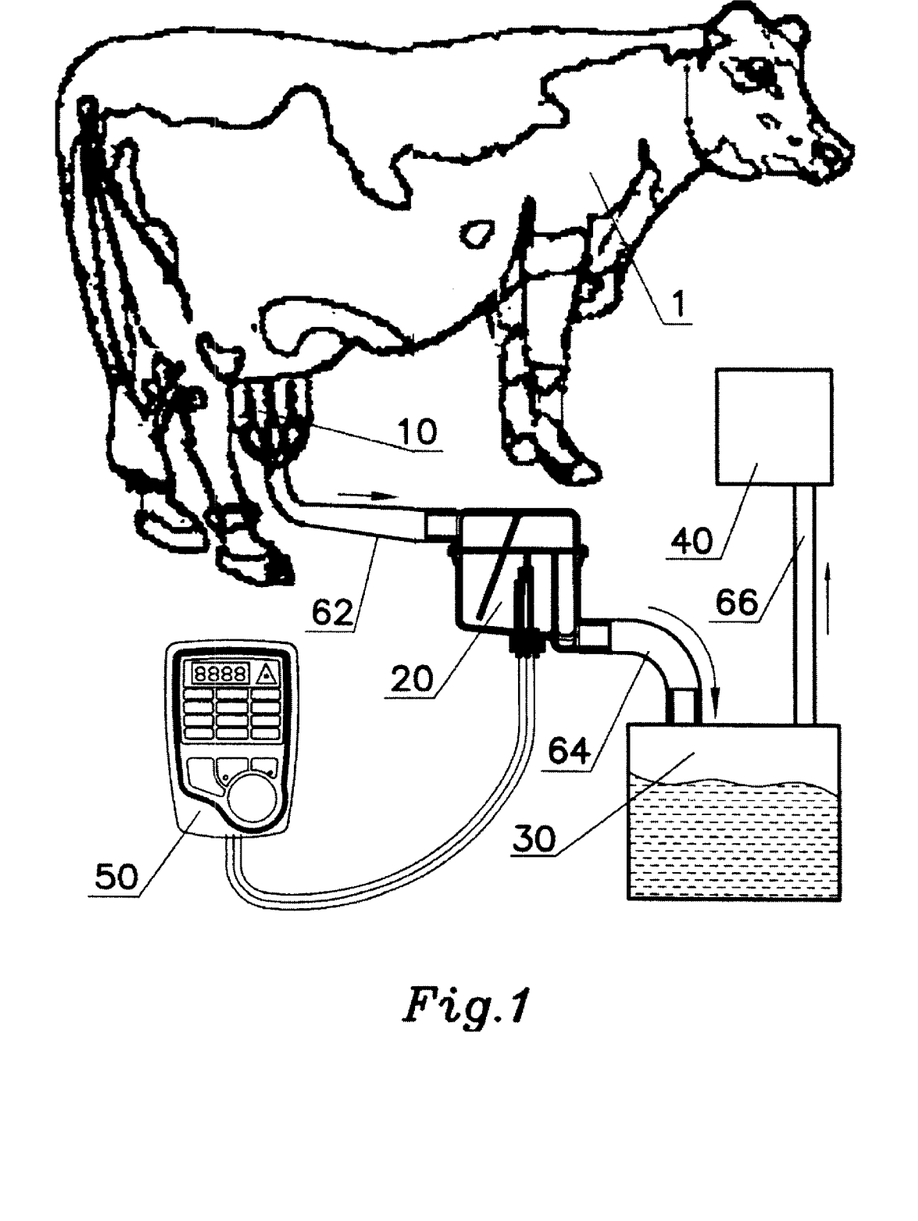
FIG. 1 is a schematic illustration of a milking installation.

Reference is now made to FIG. 1 which shows a schematic view of a milk installation. A milking claw, referenced 10, attached to the teats of cow 1, draws milk and delivers it via conduit 62 to free-flow milk meter 20. Milk meter 20 is controlled by controller 50, the later typically containing a microprocessor, in communication, generally electrical communication, with meter 20. The method of control used by controller 50 can be any of various methods known in the art, but it typically includes interaction with electrodes in meter 20 which measure the conductivity of the milk. The flow of milk from teat to meter 20 is effected by a vacuum source 40, as is the flow of milk from meter 20 via conduit 64 to storage tank 30. Vacuum source 40 is in communication with storage tank 30 via conduit 66 and through conduits 64 and 62 to milk meter 20 and milking claw 10, respectively.

Figure 2:
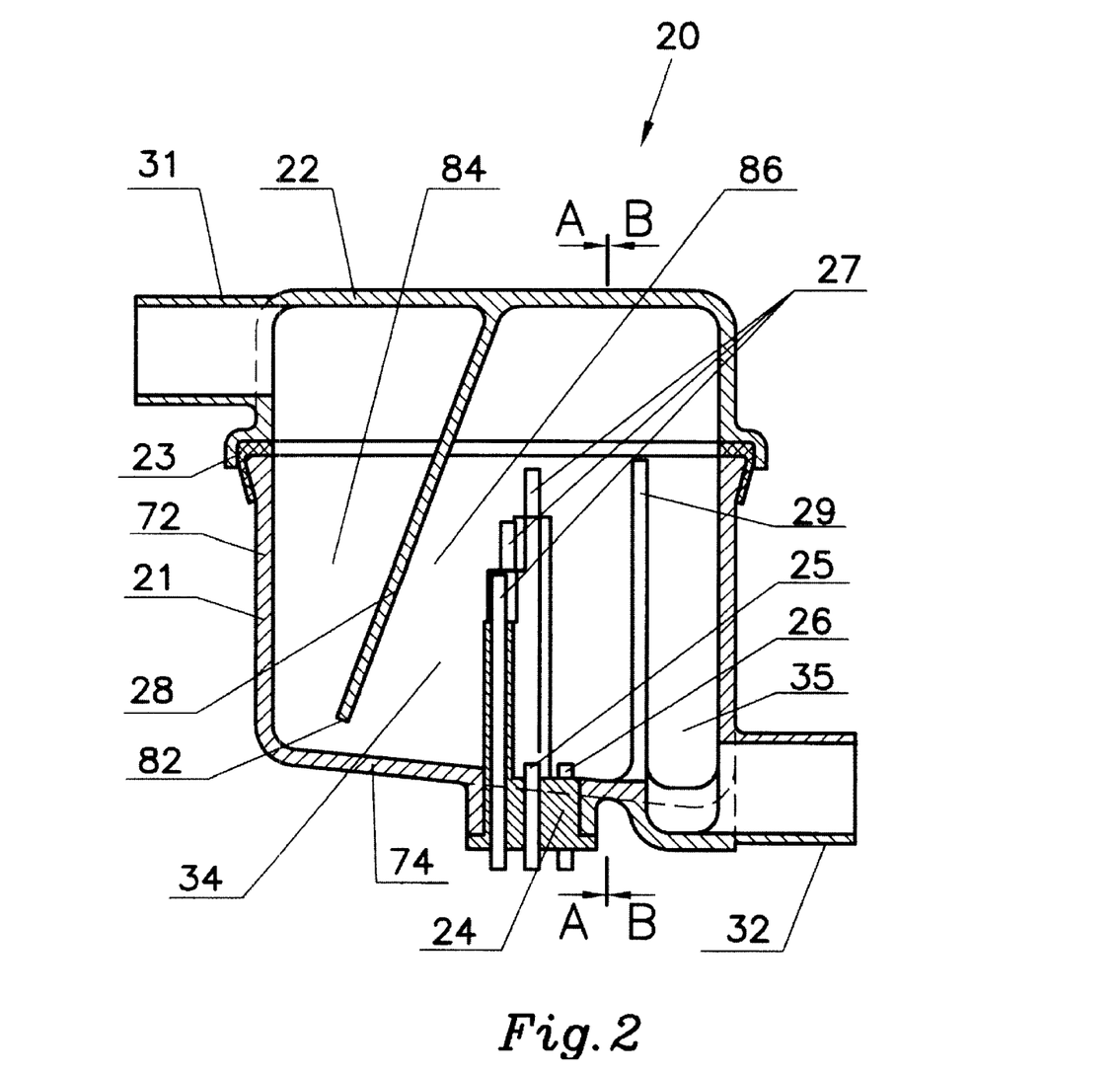
FIG. 2 is a schematic lateral sectional view of the apparatus constructed according to a preferred embodiment of the present invention.

FIG. 2, to which reference is now made, shows a schematic lateral sectional view of a liquid free-flow meter constructed and operative according to the present invention. Meter 20 includes a housing having two main parts, a cover 22 and a lower housing portion 21. Cover 22 has formed therein, typically, but not necessarily unitarily formed therein, an inlet 31 and a baffle 28. Baffle 28 is positioned substantially opposite inlet 31 in such a way as to prevent incoming milk from directly impinging on measurement electrodes 27, reference electrode 26 and common electrode 25, positioned generally in lower housing portion 21. Lower housing portion 21 is container-like, having side walls 72 integrally formed with floor 74. Typically, but not necessarily, the housing of flow meter 20 is substantially rectangular. In other configurations (not shown), the housing, for example, may be circular, elliptical or polygonal. The side walls of the housing therefore may be linear, curvilinear, or mixed linear-curvilinear surfaces. Measurement electrodes 27, as well as common and reference electrodes, referenced 25 and 26 respectively, are positioned in an electrode block 24 through which electrical leads (not shown) run and transmit signals to and from controller 50 shown in FIG. 1.

Unitarily formed in floor 74 of lower housing portion 21 is separation wall 29 which extends substantially up to, or slightly above, the height, with respect to floor 74, of the highest electrode positioned in electrode block 24. Separation wall 29 divides lower housing portion 21 of flow meter 20 into a measurement chamber 34 and a discharge chamber 35. Wall 29 retards the flow of incoming milk from spilling directly into discharge chamber 35, the latter defined by separation wall 29 and a side wall 72 of lower housing portion 21. Wall 29 contains a slot 33 (not shown in FIG. 2), best seen in FIG. 3 discussed herein below, which allows passage of fluid from measurement chamber 34 to discharge chamber 35. Discharge chamber 35 is joined to outlet 32, the latter generally integrally formed in lower housing portion 21. Outlet 32 is typically positioned in a side wall or the floor of discharge chamber 35.

Inlet 31 is attached to conduit 62 and outlet 32 is attached to conduit 64, both conduits shown in FIG. 1. The common 25 and reference 26 electrodes are positioned in electrode block 24 so that their height is very close to floor 74 of lower housing portion 21, thereby removing these electrodes from regions having substantial milk/air froth and surrounding these electrodes with milk containing very little air. Electrode block 24 is typically positioned snugly in, or attached to, floor 74 of lower housing portion 21.

Typically, but without being limiting, cover 22 and lower housing portion 21 have flared interconnecting edges. In all cases, the edges of lower housing portion 21 and cover 22 are sealingly joined, by any of various methods known in the art, producing a leak-tight seal 23.

Figure 3:
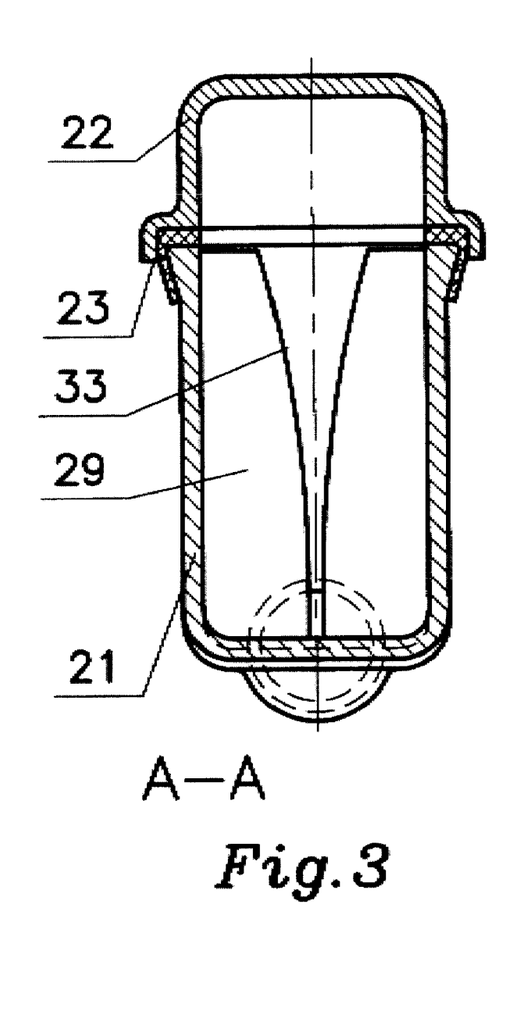
FIG. 3 is a schematic sectional view of the apparatus along line A—A of FIG. 2.

Reference is now made to FIG. 3, which shows a schematic sectional view of the free-flow meter along line A—A of FIG. 2. Separation wall 29 is shown as having a measuring slot 33 through which milk passes from measurement chamber 34 (FIG. 2) into discharge chamber 35 (FIG. 2). While measuring slot 33 is wider near its top than at its bottom, in other embodiments of the present invention the slot can have substantially uniform dimensions along its entire length. There is no inherent limitation to the profile of the slot.

It is readily appreciated by one skilled in the art that the above-described apparatus provides a milk flow rate at the time the milk level in measurement chamber 34 (FIG. 2) is sampled. This information can be used to generate data related to the total milk output, or equivalently total milk volume or total milk mass, of a cow by including an integrator in the microprocessor of controller 50 (FIG. 1) which integrates velocity (flow rate) over time. The time here refers to the duration of the measurements.

Figure 4:
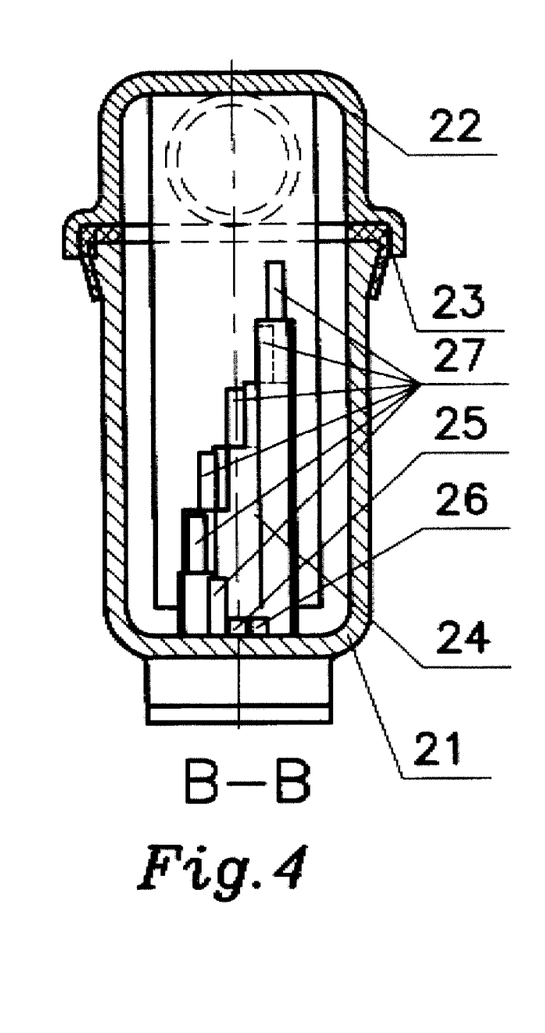
FIG. 4 is a schematic sectional view of the apparatus along line B—B of FIG. 2.
Figure 5:
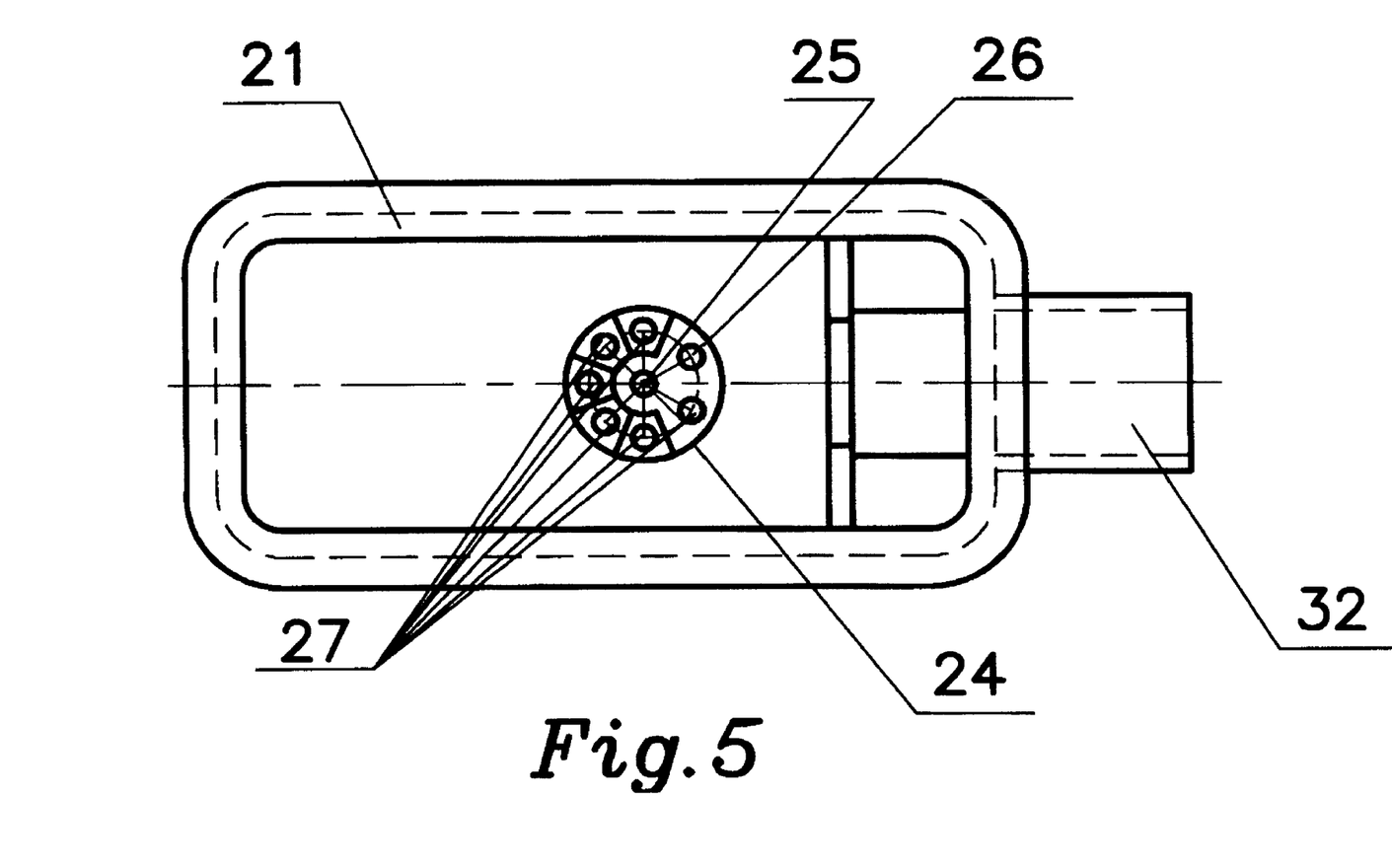
FIG. 5 is a schematic top view of the apparatus shown in FIG. 2, shown without cover 22.

FIGS. 4 and 5, to which reference is now made, schematically illustrate a sectional view of flow meter 20 constructed according to the present invention along line B—B of FIG. 2 and a top view of the free-flow meter 20 without cover 22, respectively. FIG. 4 best illustrates the stepped structure, here a helically stepped structure, of measurement electrodes 27. It also shows the position of the common 25 and reference 26 electrodes at the floor 74 of lower housing portion 21 (FIG. 2). The helical positioning of measurement electrodes 27 allows for continuous measurement by the electrodes of the milk flow rate. While FIG. 4 shows a helical positioning of the measurement electrodes, the present invention is intended to cover any stepped configuration of electrodes. A top view of the positions of measurement 27, common 25 and reference 26 electrodes is shown in FIG. 5.

Figure 6:
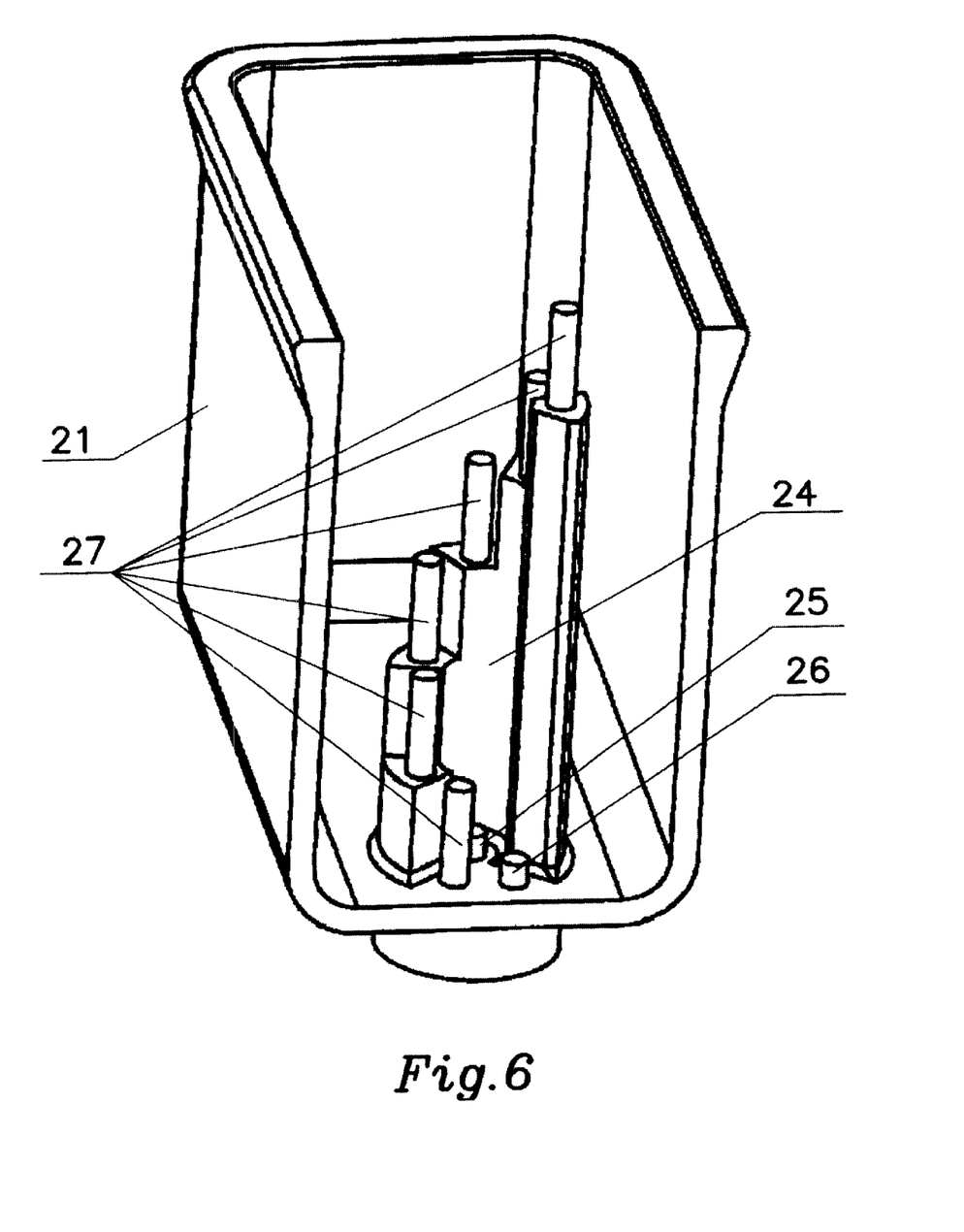
FIG. 6 is a schematic isometric cut-away view of the apparatus shown in FIG. 2.

FIG. 6, to which reference is now made, shows a side cut-away isometric view of measurement electrodes 27 disposed in a stepped configuration, here a stepped helical configuration. In FIG. 6, slot 33 in separation wall 29 is not shown.

In another embodiment of the present invention (not shown), measurement electrodes 27 are disposed in a linear staircase stepped configuration. The staircase or steps are positioned between baffle 28 and separation wall 29, with at least one measurement electrode 27 positioned vertically on each step of the staircase. In such a configuration, as in the helical configuration of FIGS. 2–6, the top of one measurement electrode reaches approximately the bottom of the exposed portion of the next electrode. In this manner, the set of measurement electrodes 27 forms a continuum extending the height of measurement chamber 34 from its floor 74 to approximately the top of wall 29.

FIGS. 2–6 show an embodiment where the measurement electrodes are partly exposed and partly covered and there is very little overlap of the exposed portions of these electrodes. However, in other embodiments, the exposed portions of electrodes covering adjacent ranges can overlap.

The positioning of the electrodes in a helical, stepped or other similar configuration between baffle 28 and separation wall 29 affords a number of advantages. The disposition of the electrodes, as discussed above, allows for measurements over a continuous range of liquid levels. As is readily apparent to one skilled in the art, conductivity measurements, and therefore liquid level, can be resolved to greater accuracy by making the steps in the electrode heights smaller, and/or by increasing the number of measurement electrodes 27.

In other metering systems which use conductivity to determine flow rates, measurements typically are made between two electrodes extending vertically to a substantial height above the meter's floor. In such cases, the measurements are made between electrodes exposed to frothy milk containing significant amounts of air. In the present invention, conductivity measurements are made between a measurement electrode 27 and the common electrode 25, the latter positioned at the bottom of measurement chamber 34 where the air content in the milk is much less than in the frothy milk layers at the top. Therefore, measurements are intrinsically more accurate. Furthermore, the method of determining flow rates by normalizing the conductivity measurements as described herein below, reduces the influence of conductivity fluctuations. Accordingly, a wider range of conductivity values can be used to accurately determine flow rates.

The above-described apparatus operates as follows. Liquid is introduced via inlet 31 to measurement chamber 34 of free-flow meter 20 by delivery against, and dropping off from, baffle 28. Baffle 28 assists in releasing a large portion of the entrapped air from the liquid and prevents direct splashing on the electrodes. The liquid, as it fills measurement chamber 34, flows through measuring slot 33 in separation wall 29 from measurement chamber 34 into discharge chamber 35. The instantaneous flow rate of the liquid is characterized by the level of liquid accumulating in measurement chamber 34. The shape of the measuring slot defines the exact relationship between the level of the liquid in measurement chamber 34 and the flow rate.

The level of liquid in measurement chamber 34 of meter 20 is determined as a function of the ratio of conductivity between electrode pairs in electrode block 24. The liquid level is determined as a function of the normalized parameter P, where $P=C_m/C_r$, and where $C_m$ is the conductivity measured by a measurement electrode and the common electrode and $C_r$ is the reference conductivity measured by the reference and common electrodes. The normalized parameter P is then compared to a look up table or to a computable function, both of which relate the normalized value to flow rate. The table or function are stored in a memory or storage unit of the processing unit, the latter typically a microprocessor.

In some embodiments, processing can include computing $C_m/C_r$ for all the measurement electrodes. All these P values are further processed to establish the liquid level in the measurement chamber, from which flow rate, mass, or volume of the liquid can be determined by using a stored look-up table or function. In yet other embodiments, the preprogrammed process can select the highest measurement electrode exposed to milk and use its normalized value to determine flow rate, mass, or volume. In all cases, the use of normalization provides more accurate measurements over wider and/or non-constant conductivity ranges; the normalized value is also independent of the value of the conductivity or other parameter being measured.

In yet other embodiments, the processor connected to the meter constructed according to the present invention as described above, can operate using direct measurement of $C_m$ values as defined above, without normalization, to determine the liquid level in the measurement chamber. This would still exploit the stepped configuration of the measurement electrodes and the baffle.

Returning now to FIG. 2, where baffle 28 is clearly shown, it is readily understood that the simple construction of baffle 28 permits ease of manufacture, increased measurement accuracy and ease of cleaning the apparatus. Baffle 28 extends from an upper location to a lower location in the housing. Typically, but not necessarily, baffle 28 is a unitary construction extending from the cover 22 of the housing. Baffle 28 provides a continuous flow surface from the upper location of the housing into the lower housing portion 21.

Baffle 28 is positioned upstream from the sensor block 24, typically an electrical sensor block. Baffle 28 divides the measurement chamber of the lower housing portion 21 into an inlet volume 84 and a measurement volume 86. Inlet volume 84 receives a generally froth-laden liquid from baffle 28, while the measurement volume receives a generally reduced froth content liquid flowing between the lower edge 82 of baffle 28 and floor 74 of lower housing portion 21.

The positioning and simple construction of baffle 28 makes construction and cleaning of meter 20 easier than conventional, more complex, free-flow meters. Baffle 28 acts as a physical barrier to splashing and prevents froth from directly impinging on the upper regions of measurement volume 86 and on electrodes 25, 26 and 27. Furthermore, the flow of milk entering meter 20 and impinging directly on baffle 28, constructed as above, allows portions of the air entrained in the milk froth to escape before the milk enters measurement volume 86, where measurements are made. As a result, measurements are more accurate.

The milk meter described herein above is typically constructed out of a plastic which is resistant to the detergents and hot water normally used to clean the apparatus. Alternatively, but without being limiting, the meter can be made of stainless steel.

It will be appreciated by persons skilled in the art that the present invention is not limited by what has been particularly shown and described herein above. Rather the scope of the invention is defined by the claims that follow:

What is claimed is:

1. Apparatus for measuring the flow of a liquid tending to froth, which includes:
    a. a flow-through housing having an interior and a floor, and which further includes:
        i. a separation wall which divides said housing into a measurement chamber and a discharge chamber, said wall having a slot therein which allows the liquid to freely flow from said measurement chamber into said discharge chamber; and
        ii. an inlet communicating with said measurement chamber, whereby liquid enters said housing, and an outlet communicating with said discharge chamber, whereby liquid exits said housing; and
    b. electrical sensor apparatus for sensing the level of the liquid in the measurement chamber, wherein said electrical sensor apparatus includes:
        i. a reference sensor and a common sensor both positioned proximate to said floor, and
        ii. a plurality of measurement sensors positioned within said measurement chamber, wherein said measurement sensors are spaced apart in a generally vertical stepped continuum stretching from said floor of said housing to a height substantially equal to the top of said separation wall at predetermined measurement intervals; and
    c. processing apparatus for evaluating a flow rate, according to a preprogrammed process, based on readings received from said sensors.

2. Apparatus according to claim 1 wherein said processing apparatus includes a microprocessor which is operative to receive said readings from said sensors, and to convert said readings to a flow rate by using a look-up table stored in a memory unit, thereby to correlate said readings to a flow rate.

3. Apparatus according to claim 1 wherein said processing apparatus includes a microprocessor which is operative to receive said readings from said sensors, and to convert said readings to a flow rate by using a function stored in a memory unit, thereby to correlate said readings to a flow rate.

4. Apparatus according to claim 1, wherein during use of said processing apparatus, said common and reference sensors are operative to measure an electrical parameter of the liquid proximate to said floor of said housing so as to determine a first value and at least one of said plurality of measurement sensors is operative to measure an electrical parameter of the liquid in said at least one measurement sensor's designated range so as to determine at least one second value, said processing apparatus further includes:

means for normalizing the electrical parameter measurements of the liquid by evaluating the at least one second value in relation to the first value, thereby to obtain at least one normalized value of said parameter; and means for converting said at least one normalized value to a flow rate.

5. Apparatus according to claim 4 wherein said means for normalizing the parameter measurements and said means for converting said at least one normalized value is a microprocessor.

6. Apparatus according to claim 1 wherein said plurality of measurement sensors are positioned in a generally stepped configuration, at least one measurement sensor per step, the bottom of the bottom-most measurement sensor being positioned in, and extending from, said floor of said housing and the top of the topmost sensor being positioned substantially co-linear with the uppermost portion of said separation wall.

7. Apparatus according to claim 6 wherein said plurality of measurement sensors are positioned in a generally helically stepped configuration.

8. Apparatus according to claim 6 wherein the plurality of measurement sensors are positioned in a generally linear staircase configuration.

9. Apparatus according to claim 1 wherein said sensors are electrodes.

10. Apparatus according to claim 9 wherein said electrodes are electrodes which measure conductivity.

11. Apparatus according to claim 1 wherein said processing apparatus further includes an integrator operative to integrate over time a series of flow rates obtained in accordance with said preprogrammed process, thereby determining the mass of liquid delivered over that period of time.

12. Apparatus according to claim 1 wherein said processing apparatus further includes an integrator operative to integrate over time a series of flow rates obtained in accordance with said preprogrammed process, thereby determining the volume of liquid delivered over that period of time.

13. Apparatus according to claim 1 wherein said processing apparatus, further includes a microprocessor which is operative to receive signals from said sensors, and to convert the received signals to a normalized value of a parameter being measured and converting the normalized value to a flow rate by using a lookup table stored in a storage unit of said processing apparatus, said look up table relating the normalized value of the measured parameter to a flow rate.

14. Apparatus according to claim 1 wherein said processing apparatus further includes a microprocessor is operative to receive signals from said sensors, and to convert the received signals to a normalized value of a parameter being measured and converting the normalized value to a flow rate by using a function stored in a storage unit of said processing apparatus, said function relating the normalized value of the measured parameter to a flow rate.

15. Apparatus according to claim 1 further including a baffle extending from an upper location of said housing to a lower location therein, said baffle having a lower free edge and providing a continuous flow surface from said upper location of said housing into said lower housing portion and wherein said baffle is positioned upstream of said electrical sensor apparatus, said baffle dividing the measurement chamber into an inlet volume which is operative to receive a generally froth-laden liquid flow from said baffle, and a measurement volume which is operative to receive a generally reduced froth content liquid flowing between said lower free edge of said baffle and said floor.

16. Apparatus according to claim 1 wherein said processing apparatus is operative to evaluate a volumetric flow rate.

17. Apparatus according to claim 1 wherein said processing apparatus is operative to evaluate a mass flow rate.

18. Apparatus for measuring the flow of a liquid tending to froth, which includes a flow-through housing which has:
   a. an inlet formed at an upper location of said housing, for facilitating the inflow thereinto of a liquid having a tendency to froth;
   b. a lower housing portion having an interior, a floor, and an outlet formed at a lower location for facilitating free outflow of the liquid from said lower housing portion;
   c. a cover configured for placement over said lower portion;
   d. a separation wall positioned in said lower housing portion which divides said lower housing portion into a measurement chamber and a discharge chamber, said wall having a slot permitting free-flow of the liquid from said measurement chamber into said discharge chamber;
   e. electrical sensor apparatus positioned in said measurement chamber for sensing the level of the liquid in said lower housing portion; and
   f. a baffle extending from an upper location of said housing to a lower location therein, said baffle having a lower free edge providing a continuous flow surface from said upper location of said housing into said lower housing portion,
   wherein said baffle is positioned upstream of said electrical sensor apparatus, and so as to divide said measurement chamber into an inlet volume which is operative to receive a generally froth-laden liquid flow from said baffle, and a measurement volume which is operative to receive a generally reduced froth content liquid flowing between said lower free edge of said baffle and said floor.

19. Apparatus according to claim 18, wherein said baffle is formed unitarily with said cover, such that removal of said cover removes the division of said lower housing portion into said separate inlet and measurement volumes.

20. Apparatus according to claim 18, wherein said inlet is formed in said cover for facilitating the inflow into said housing of a liquid having a tendency to froth.

21. Apparatus according to claim 18 wherein said electrical sensor apparatus includes a reference sensor, a common sensor and a plurality of measurement sensors positioned between said baffle and said separation wall in said measurement chamber, said reference and common sensors positioned proximate to said floor and said plurality of measurements sensors positioned vertically and configured to form a generally stepped continuum stretching from said floor of said housing to a height substantially equal to the uppermost portion of said separation wall, whereby the plurality of said measurement sensors in contact with the liquid measure a parameter with respect to said common sensor, the measured value normalized by the value of the parameter as measured by said common sensor with reference to said reference sensor, said normalized parameter convertible to a flow rate by using a processing apparatus according to a preprogrammed process.

22. Apparatus according to claim 21 wherein said processing apparatus is operative to evaluate a volumetric flow rate.

23. Apparatus according to claim 21 wherein said processing apparatus is operative to evaluate a mass flow rate.

24. Apparatus according to claim 18 wherein said electrical sensor apparatus includes a plurality of measurement sensors, said sensors positioned in a generally stepped configuration, at least one measurement sensor per step, the bottom of the bottom-most measurement sensor being positioned in, and extending from, said floor of said housing, and the top of the topmost sensor being positioned substantially co-linear with the uppermost of said separation wall.

25. Apparatus according to claim 24 wherein said plurality of measurement sensors are positioned in a generally helically stepped configuration.

26. Apparatus according to claim 24 wherein said plurality of measurement sensors are positioned in a generally linear staircase configuration.

27. Apparatus according to claim 18 wherein said electrical sensor apparatus includes a plurality of electrodes.

28. Apparatus according to claim 27 wherein said plurality of electrodes are electrodes which measure conductivity.

29. A method for measuring the rate of flow of a liquid including the steps of:
  a. passing a liquid through a housing;
  b. measuring an electrical parameter of the liquid proximate to the floor of the housing so as to determine a first value;
  c. measuring the electrical parameter of the liquid at at least one level in the housing, the at least one level including the highest level reached by the liquid so as to determine at least one second value;
  d. normalizing the electrical parameter measurement of the liquid measured by evaluating the at least one second value in relation to the first value, thereby to obtain at least one normalized value; and
  e. converting the at least one normalized value to a flow rate in accordance with a preprogrammed process.

30. A method according to claim 29 wherein the parameter of the liquid being measured is conductivity.

31. A method according to claim 29 further comprising the step of integrating over time the flow rate determined at each measurement time in the converting step, and converting the integrated value to a volume of liquid passing through the housing over the time of the measurements.

32. A method according to claim 29 further comprising the step of integrating over time the flow rate determined at each measurement time in the converting step, and converting the integrated value to a mass of liquid passing through the housing over the time of the measurements.

33. A method according to claim 29 wherein the liquid being measured is milk.

34. Apparatus for measuring the flow of a liquid tending to froth, which includes:
  a. a flow-through housing having an interior and a floor, and which further includes:
    i. a separation wall which divides said housing into a measurement chamber and a discharge chamber, said wall having a slot therein which allows the liquid to freely flow from said measurement chamber into said discharge chamber; and
    ii. an inlet communicating with said measurement chamber, whereby liquid enters said housing, and an outlet communicating with said discharge chamber, whereby liquid exits said housing; and
  b. electrical sensor apparatus for sensing the level of the liquid in the measurement chamber, wherein said electrical sensor apparatus includes:
    i. a reference sensor and a common sensor both positioned proximate to said floor, and
    ii. a plurality of measurement sensors positioned within said measurement chamber, wherein said measurement sensors are spaced apart in a generally vertical stepped continuum stretching from said floor of said housing to a height substantially equal to the top of said separation wall at predetermined measurement intervals; and
  c. processing apparatus for evaluating a flow rate, according to a preprogrammed process, based on readings received from said sensors, wherein said processing apparatus includes a microprocessor which is operative to receive said readings from said sensors, and to convert said readings to a flow rate by using a look-up table stored in a memory unit, thereby to correlate said readings to a flow rate.

35. Apparatus for measuring the flow of a liquid tending to froth, which includes:
  a. a flow-through housing having an interior and a floor, and which further includes:
    i. a separation wall which divides said housing into a measurement chamber and a discharge chamber, said wall having a slot therein which allows the liquid to freely flow from said measurement chamber into said discharge chamber; and
    ii. an inlet communicating with said measurement chamber, whereby liquid enters said housing, and an outlet communicating with said discharge chamber, whereby liquid exits said housing; and
  b. electrical sensor apparatus for sensing the level of the liquid in the measurement chamber, wherein said electrical sensor apparatus includes:
    i. a reference sensor and a common sensor both positioned proximate to said floor, and
    ii. a plurality of measurement sensors positioned within said measurement chamber, wherein said measurement sensors are spaced apart in a generally vertical stepped continuum stretching from said floor of said housing to a height substantially equal to the top of said separation wall at predetermined measurement intervals, wherein said plurality of measurement sensors are positioned in a generally helically stepped configuration, at least one measurement sensor per step, the bottom of the bottom-most measurement sensor being positioned in, and extending from, said floor of said housing and the top of the topmost sensor being positioned substantially co-linear with the uppermost portion of said separation wall; and
  c. processing apparatus for evaluating a flow rate, according to a preprogrammed process, based on readings received from said sensors.

36. Apparatus for measuring the flow of a liquid tending to froth, which includes:
  a. a flow-through housing having an interior and a floor, and which further includes:

i. a separation wall which divides said housing into a measurement chamber and a discharge chamber, said wall having a slot therein which allows the liquid to freely flow from said measurement chamber into said discharge chamber; and ii. an inlet communicating with said measurement chamber, whereby liquid enters said housing, and an outlet communicating with said discharge chamber, whereby liquid exits said housing; and b. electrical sensor apparatus for sensing the level of the liquid in the measurement chamber, wherein said electrical sensor apparatus includes:

i. a reference sensor and a common sensor both positioned proximate to said floor, and ii. a plurality of measurement sensors positioned within said measurement chamber, wherein said measurement sensors are spaced apart in a generally vertical stepped continuum stretching from said floor of said housing to a height substantially equal to the top of said separation wall at predetermined measurement intervals, wherein said plurality of measurement sensors are positioned in a generally linear staircase stepped configuration, at least one measurement sensor per step, the bottom of the bottom-most measurement sensor being positioned in, and extending from, said floor of said housing and the top of the topmost sensor being positioned substantially co-linear with the uppermost portion of said separation wall; and c. processing apparatus for evaluating a flow rate, according to a preprogrammed process, based on readings received from said sensors.

37. Apparatus for measuring the flow of a liquid tending to froth, which includes:

a. a flow-through housing having an interior and a floor, and which further includes:

i. a separation wall which divides said housing into a measurement chamber and a discharge chamber, said wall having a slot therein which allows the liquid to freely flow from said measurement chamber into said discharge chamber; and ii. an inlet communicating with said measurement chamber, whereby liquid enters said housing, and an outlet communicating with said discharge chamber, whereby liquid exits said housing; and b. electrical sensor apparatus for sensing the level of the liquid in the measurement chamber, wherein said electrical sensor apparatus includes:

i. a reference sensor and a common sensor both positioned proximate to said floor, and ii. a plurality of measurement sensors positioned within said measurement chamber, wherein said measurement sensors are spaced apart in a generally vertical stepped continuum stretching from said floor of said housing to a height substantially equal to the top of said separation wall at predetermined measurement intervals; and c. processing apparatus for evaluating a flow rate, according to a preprogrammed process, based on readings received from said sensors, wherein said processing apparatus, further includes a microprocessor which is operative to receive signals from said sensors, and to convert the received signals to a normalized value of a parameter being measured and converting the normalized value to a flow rate by using a lookup table stored in a storage unit of said processing apparatus, said lookup table relating the normalized value of the measured parameter to a flow rate.

38. Apparatus for measuring the flow of a liquid tending to froth, which includes a flow-through housing which has:

a. an inlet formed at an upper location of said housing, for facilitating the inflow thereinto of a liquid having a tendency to froth;

b. a lower housing portion having an interior, a floor, and an outlet formed at a lower location for facilitating free outflow of the liquid from said lower housing portion;

c. a cover configured for placement over said lower portion;

d. a separation wall positioned in said lower housing portion which divides said lower housing portion into a measurement chamber and a discharge chamber, said wall having a slot permitting free-flow of the liquid from said measurement chamber into said discharge chamber;

e. electrical sensor apparatus positioned in said measurement chamber for sensing the level of the liquid in said lower housing portion, wherein said electrical sensor apparatus includes a plurality of measurement sensors, said sensors positioned in a generally helically stepped configuration, at least one measurement sensor per step, the bottom of the bottom-most measurement sensor being positioned in, and extending from, said floor of said housing, and the top of the topmost sensor being positioned substantially co-linear with the uppermost of said separation wall; and f. a baffle extending from an upper location of said housing to a lower location therein, said baffle having a lower free edge providing a continuous flow surface from said upper location of said housing into said lower housing portion, wherein said baffle is positioned upstream of said electrical sensor apparatus, and so as to divide said measurement chamber into an inlet volume which is operative to receive a generally froth-laden liquid flow from said baffle, and a measurement volume which is operative to receive a generally reduced froth content liquid flowing between said lower free edge of said baffle and said floor.

39. Apparatus for measuring the flow of a liquid tending to froth, which includes a flow-through housing which has:

a. an inlet formed at an upper location of said housing, for facilitating the inflow thereinto of a liquid having a tendency to froth;

b. a lower housing portion having an interior, a floor, and an outlet formed at a lower location for facilitating free outflow of the liquid from said lower housing portion;

c. a cover configured for placement over said lower portion;

d. a separation wall positioned in said lower housing portion which divides said lower housing portion into a measurement chamber and a discharge chamber, said wall having a slot permitting free-flow of the liquid from said measurement chamber into said discharge chamber;

e. electrical sensor apparatus positioned in said measurement chamber for sensing the level of the liquid in said lower housing portion, wherein said electrical sensor apparatus includes a plurality of measurement sensors, said sensors positioned in a generally linear staircase stepped configuration, at least one measurement sensor per step, the bottom of the bottom-most measurement sensor being positioned in, and extending from, said floor of said housing, and the top of the topmost sensor being positioned substantiality co-linear with the uppermost of said separation wall; and f. a baffle extending from an upper location of said housing to a lower location therein, said baffle having a lower free edge providing a continuous flow surface from said upper location of said housing into said lower housing portion, wherein said baffle is positioned upstream of said electrical sensor apparatus, and so as to divide said measurement chamber into an inlet volume which is operative to receive a generally froth-laden liquid flow from said baffle, and a measurement volume which is operative to receive a generally reduced froth content liquid flowing between said lower free edge of said baffle and said floor.

* * * * *